(12) United States Patent  (10) Patent No.: US 7,628,078 B2
Matsui et al.  (45) Date of Patent: Dec. 8, 2009

(54) COMBUSTION PRESSURE SENSOR

(75) Inventors: Hiroshige Matsui, Aichi-ken (JP); Inao Toyoda, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/882,470

(22) Filed: Aug. 2, 2007

(65) Prior Publication Data
US 2008/0053237 A1 Mar. 6, 2008

(30) Foreign Application Priority Data
Sep. 6, 2006 (JP) ............... 2006-241193

(51) Int. Cl.
G01L 9/00 (2006.01)
G01L 7/08 (2006.01)
(52) U.S. Cl. .......................... 73/715; 73/723
(58) Field of Classification Search ................... 73/715, 73/725, 726, 727, 756
See application file for complete search history.

(56) References Cited

U.S. PATENT DOCUMENTS

2005/0150302 A1* 7/2005 Barron ..................... 73/719
2006/0090566 A1* 5/2006 Oda ........................ 73/715
2006/0162141 A1 7/2006 Takeuchi

FOREIGN PATENT DOCUMENTS

DE 10 2005 050 598 5/2006
DE 10 2005 058 677 8/2006
JP A-2006-208043 8/2006

OTHER PUBLICATIONS

Office Action dated Feb. 3, 2009 in corresponding German patent application No. 10 2007 034 946.9-52 (and English abstract).

* cited by examiner

Primary Examiner—Lisa M Caputo
Assistant Examiner—Punam Patel
(74) Attorney, Agent, or Firm—Posz Law Group, PLC

(57) ABSTRACT

The pressure sensor includes a first tubular member including at one end portion thereof a sensing section outputting an electrical signal indicative of a pressure applied thereto, and an opening section formed at the other end portion thereof, a second tubular member including an opening section formed at one end portion thereof and a diaphragm located at one end portion thereof, a housing having an opening at one end portion thereof, and a pressure transmission member operating to transmit a pressure applied thereto to the sensing section. The first and second tubular members are integrally connected to each other at their the opening sections. A fixing portion between the first and the second tubular members is located inside the housing, an outer periphery of the second tubular member is fixed to an inner periphery of the opening section of the housing.

9 Claims, 5 Drawing Sheets

COMBUSTION PRESSURE SENSOR

CROSS-REFERENCE TO RELATED APPLICATION

This application is related to Japanese Patent Application No. 2006-241193 filed on Sep. 6, 2006, the contents of which are hereby incorporated by reference.

BACKGROUND OF THE INVENTION

1. Field of the Invention

The present invention relates to a pressure sensor having a tubular member inserted into an opening of a housing thereof, the tubular member including a sensing section located at one end thereof, a pressure transmission member located in a hollow space thereof, and a pressure-receiving diaphragm located at the other end thereof.

2. Description of Related Art

A pressure sensor of such type is disclosed in Japanese Patent Application Laid-open No. 2006-208043 filed by the same inventor of the present invention. FIG. 7 is a schematic cross-sectional view showing a major part of the pressure sensor disclosed in this patent application.

As shown in this figure, this pressure sensor includes a first hollow tubular member 1 having a metal stem 20 as a main body thereof. The first tubular member 1 includes a sensing section 22, 30 located at one end portion thereof which outputs an electrical signal indicative of a pressure applied thereto, and an opening section 21 formed at the other end thereof. The first tubular member 1 further includes a thin-walled section at the one end portion thereof which serves as a diaphragm 22 and on which a sensing element 30 is provided. The diaphragm 22 and the sensing element 30 constitute the sensing section 22, 30.

This pressure sensor further includes a second hollow tubular member 2 having a metal case 15 as a main body thereof. The second tubular member 2 includes an opening section 16 formed at one end portion thereof, and a pressure-receiving diaphragm 14 located at the other end portion thereof. These first and second tubular members 1, 2 are fixedly connected to each other at their opening sections 16, 21 such that their hollow portions communicate to each other.

More specifically, the opening section 21 of the first tubular member 1 is inserted into the opening section 16 of the second tubular member 2, and the first and second tubular members 1, 2 are integrally connected to each other by laser welding at a weld portion K1, so that they form a single tube.

A pressure transmission member 17 is housed in a hollow space of the tubular members 1, 2 integrally connected to each other. One end of the pressure transmission member 17 is located on the side of the sensing section 22, 30, and the other end is located on the side of the pressure-receiving diaphragm 14. This pressure sensor further includes a housing 10 having an opening section 11 formed at one end thereof. Although not shown in FIG. 7, the housing 10 contains therein a circuit board and wires for processing a signal outputted from the sensing element 30.

The tubular members 1, 2 integrally connected to each other are inserted into the opening section 11 to be supported by the housing 10 such that the sensing section 22, 30 is located inside the housing 10, and the pressure-receiving diaphragm 14 projects from the housing 10. The first tubular member 1 and the housing 10 are fixed to each other by laser welding at a weld portion K2.

In the pressure sensor having the above described structure, the pressure applied to the pressure-receiving diaphragm 14 is transmitted to the sensing section 22, 30 through the pressure transmission member 17. The resultant distortion of the diaphragm 22 is converted into an electrical signal by the sensing element 30.

Ideally, all the center axes of the first tubular member 1, second tubular member 2, and housing 10 should align with each other and extend in the same direction (in the vertical direction in FIG. 7).

However, since the first and second tubular members 1, 2 project form the opening section 11 of the housing 10, an axial misalignment in which their axes are inclined with respect to one another may occur in these members.

The pressure sensor of the type described above is mounted to a pressure-sensing object such as a vehicle engine in such a state that the tubular members 1, 2 and the housing 10 are inserted into a hole formed in the engine. Accordingly, if the axial misalignment is excessively large, there is a fear that the pressure sensor cannot be mounted to the engine.

Since there is some clearance between the opening section 11 of the housing 10 and an outer periphery of the first tubular member 1 inserted into the opening section 11, and also between an inner periphery of the opening section 16 of the second tubular member 2 and an outer periphery of the opening section 21 of the first tubular member 1 inserted into the opening section 16, there is a possibility that the first tubular member 1 is inclinedly welded to the housing 10, and the second tubular member 2 is inclinedly welded to the first tubular member 1. In the pressure sensor described above, the axial misalignment tends to become large, because there are two weld portions located outside the housing 10.

SUMMARY OF THE INVENTION

The present invention provides a pressure sensor comprising:

a first tubular member including at one end portion thereof a sensing section outputting an electrical signal indicative of a pressure applied thereto, and an opening section formed at the other end portion thereof;

a second tubular member including an opening section formed at one end portion thereof, and a diaphragm located at one end portion thereof;

a housing having an opening at one end portion thereof; and a pressure transmission member operating to transmit a pressure applied thereto to the sensing section;

the first and second tubular members being integrally connected to each other at the opening section of the first tubular member and the opening section of the second tubular member, the pressure transmission member being housed in a hollow space of the first and second tubular members integrally connected to each other such that one end portion thereof is located at a side of the sensing section and the other end portion thereof is located at a side of the diaphragm, the first and second tubular members integrally connected to each other being inserted into the opening section of the housing to be supported by the housing such that the sensing section is located inside the housing and the diaphragm projects from the housing, wherein the first and second tubular members integrally connected to each other is inserted into the opening section of the housing until a midway portion of the second tubular member from a side of the sensing section, so that a fixing portion between the first and the second tubular members is located inside the housing, an outer periphery of the second tubular member being fixed to an inner periphery of the opening section of the housing.

According to the present invention, it is possible to substantially reduce the above described axial misalignment in a a pressure sensor of the type having a tubular member inserted into an opening of a housing thereof, the tubular member including a sensing section located at one end thereof, a pressure transmission member located in a hollow space thereof, and a pressure-receiving diaphragm located at the other end thereof.

The outer periphery of the second tubular member and the inner periphery of the opening section of the housing may be fixed to each other by pressure insertion therebetween.

The outer periphery of the second tubular member and the inner periphery of the opening section of the housing may be joined together by welding.

The first and the second tubular members may be fixed to each other at the fixing portion by pressure-inserting one of the opening section of the first tubular member and the opening section of the second tubular member into the other of the opening section of the first tubular member and the opening section of the second tubular member A diameter of the hollow space at a position at which a midway portion of the pressure transmission member is located may be smaller than diameters of the hollow space at positions at which end portions of the pressure transmission member are located respectively.

A midway portion of the hollow space facing the midway portion of the pressure transmission member may be formed by the second tubular member, and a wall thickness of the second tubular member is larger than a wall thickness of the first tubular member.

A displacement preventing section operating to prevent one of end portions of the pressure transmission member from displacing in a direction orthogonal to a longitudinal direction thereof may be provided in at least one of the sensing section and the diaphragm. The displacement preventing section may be formed as an engagement section facing one of the end portions of the pressure transmission member, the one of the end portions of the pressure transmission member being engaged with the engagement section.

The engagement section may be constituted by a recess into which the one of the end portions of the pressure transmission member is fitted.

The engagement section may be constituted by a recess formed in one of the end portions of the pressure transmission member, and a projection formed in the one of the end portions of the pressure transmission member, the projection being fitted into the recess.

Other advantages and features of the invention will become apparent from the following description including the drawings and claims.

PREFERRED EMBODIMENTS OF THE INVENTION

In the following, various embodiments of the invention will be explained with reference to the accompanying drawings.

Figure 7:
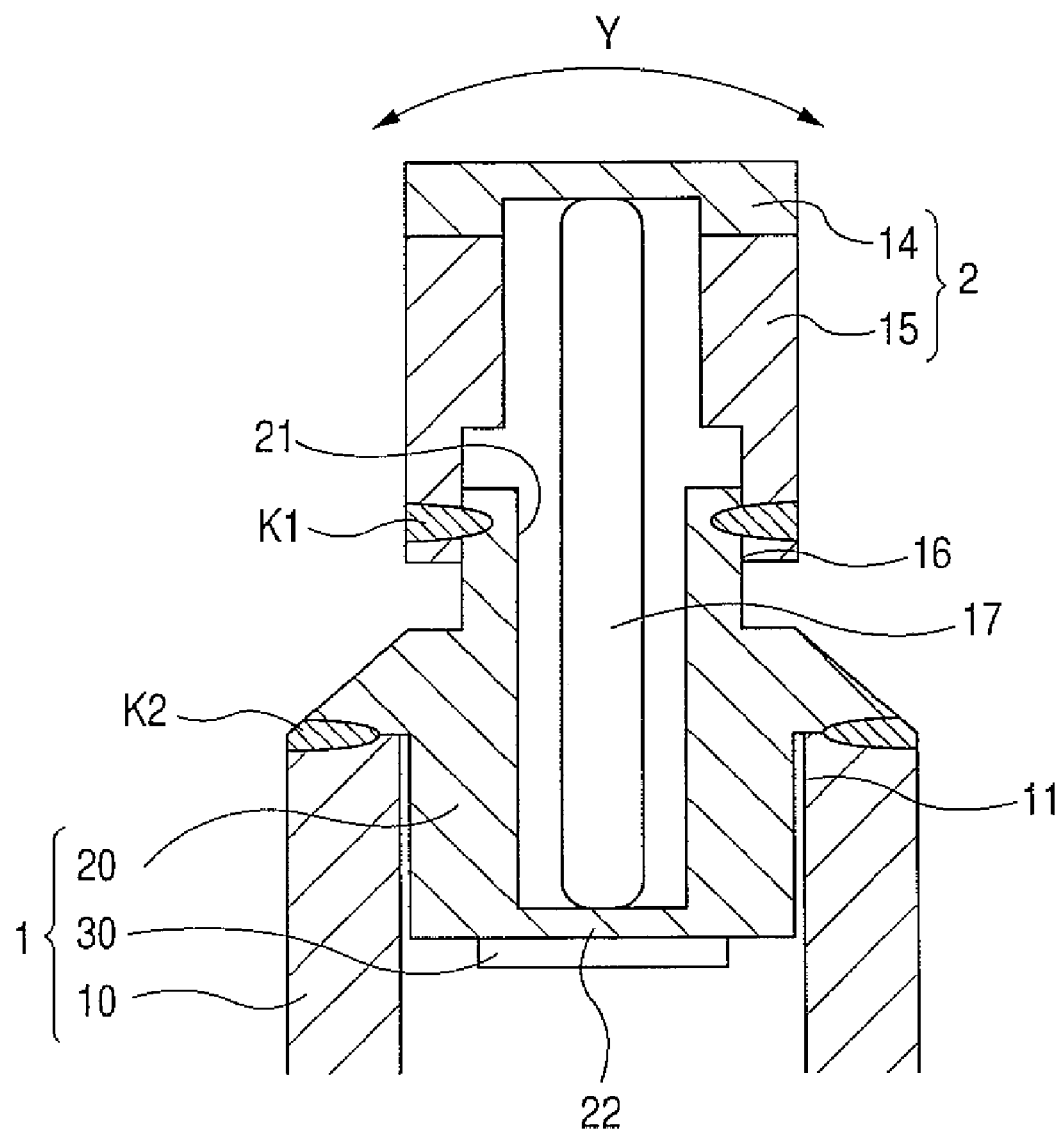
FIG. 7 is a schematic cross-sectional view showing a major part of a pressure sensor disclosed in an earlier patent application filed by the same inventor as the present invention.

In these drawings including FIG. 7, the same or corresponding elements are indicated by the same reference numerals.

First Embodiment

Figure 1:
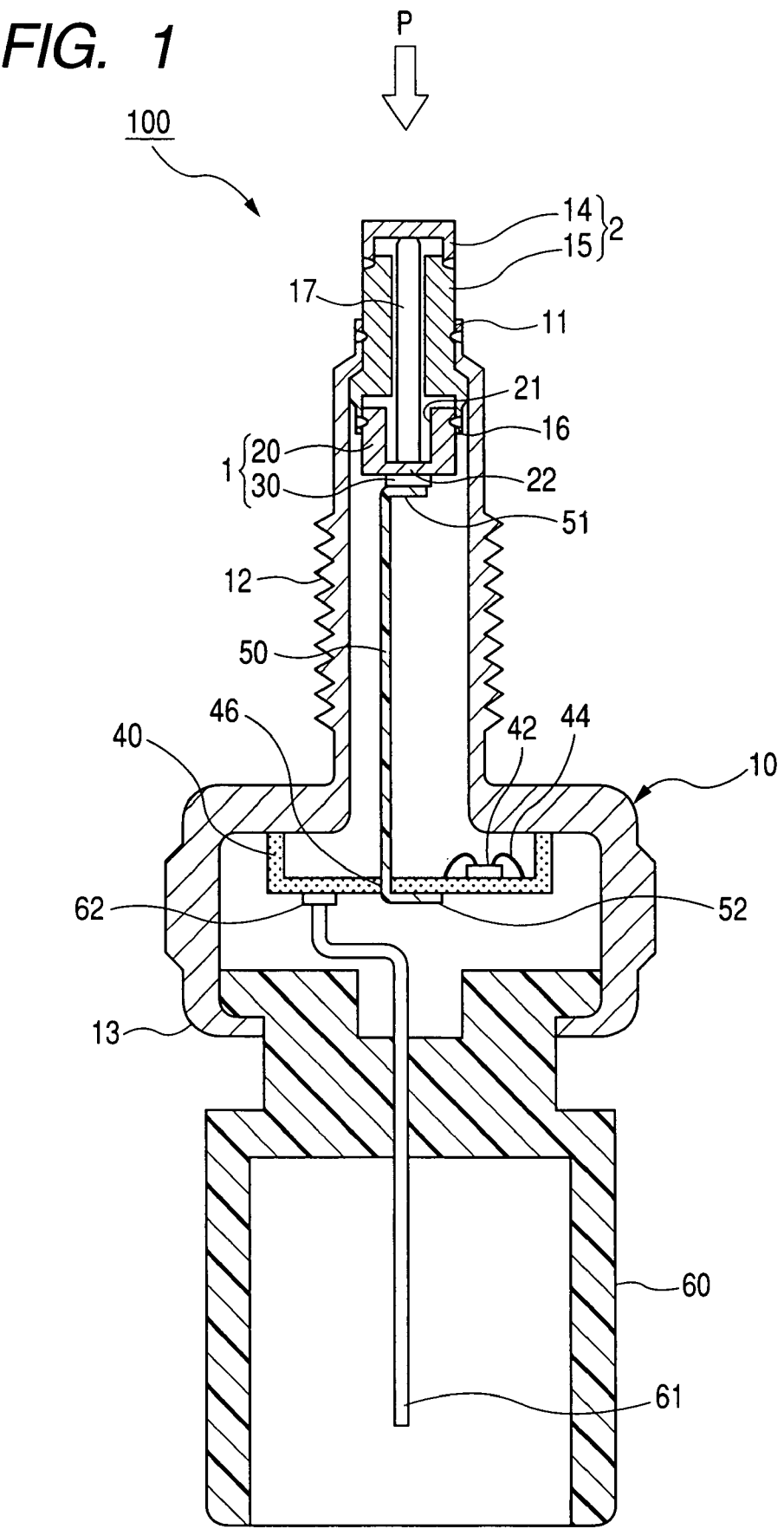
FIG. 1 is a schematic cross-sectional view showing an overall structure of a pressure sensor according to a first embodiment of the invention.
Figure 2:
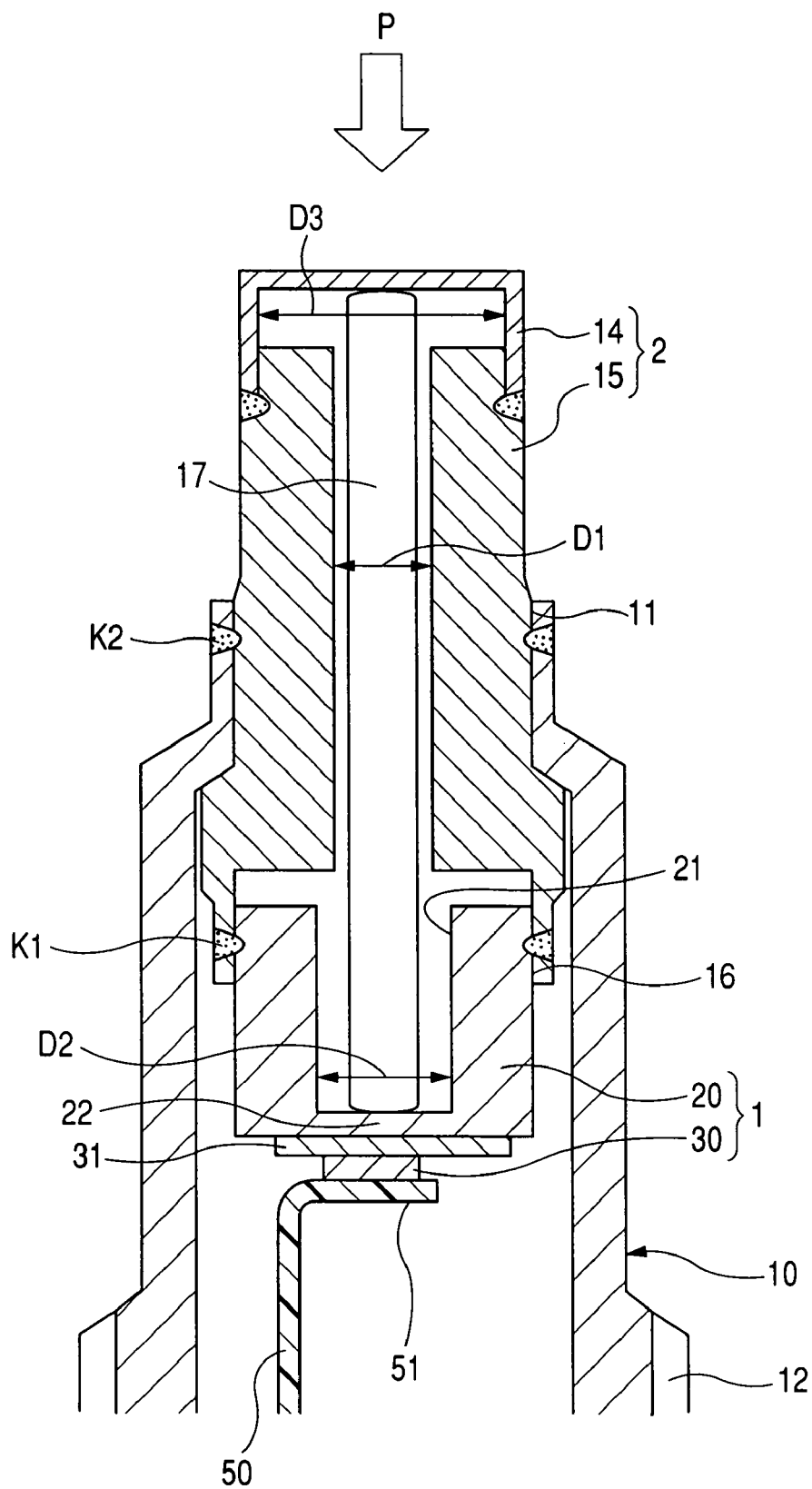
FIG. 2 is a schematic cross-sectional enlarged view around an opening section of a housing of the pressure sensor.

FIG. 1 is a schematic cross-sectional view showing an overall structure of a pressure sensor 100 according to a first embodiment of the invention. FIG. 2 is a schematic cross-sectional enlarged view around an opening section 11 of a housing 10 of the pressure sensor 100.

This pressure sensor 100 can be used as a combustion pressure sensor for a vehicle engine. The pressure sensor 100 is mounted to a pressure-sensing object such as a vehicle engine in such a state that the opening section 11 of the housing 10 thereof is inserted into a mounting hole formed in an engine head of the engine, and secured by screws or the like, for the purpose of detecting a pressure in a combustion chamber of the engine (may be referred to as "in-cylinder pressure P" or "pressure P" hereinafter).

A portion of the housing 10 to be inserted into the mounting hole formed in the engine head has a long tubular shape.

This portion is formed with threads 12 at its outer periphery for screw connection with the engine head. The housing 10, which is made of metal such as stainless steel, can be fabricated by cutting or cold forging.

The pressure sensor 100 is applied with the in-cylinder pressure P from the side of the opening section 11 as shown by the arrows in FIGS. 1 and 2 when it is screw-mounted to the engine head by the threads 12 of the housing 10.

The pressure sensor includes a first tubular member 1 and a second tubular member 2 integrally connected to each other and inserted into the opening section 11 of the housing 10 to be supported by the housing 10. The first tubular member 1 is constituted by a metal stem 20 and a sensing element 30, and the second tubular member 2 is constituted by a metal case 15 and a pressure-receiving diaphragm 14.

The metal stem 20, which has a hollow tubular shape and constitutes a main body of the first tubular member 1, includes an opening section 21 formed at one end thereof, and a thin distortion section serving as a diaphragm 22 and closing the other end thereof.

The metal stem 20 is made of a material containing Fe, Ni and Co, or Fe and Ni as main components, and containing Ti, Nb and Al, or Ti and Nb as a precipitation hardened material, such as precipitation hardened stainless steel. The metal stem 20 can be fabricated by pressing, cutting, or cold forging.

The sensing element 30 is glass welded to an outer surface of the diaphragm 22 of the metal stem 20 by a low melting point glass 31 (see FIG. 2). The sensing element 30 may be of the type including a silicon semiconductor chip as a main body, and a bridge circuit constituted by diffused resistor elements formed in the semiconductor chip.

The sensing element 30 operates as a distortion gauge which, when the diaphragm 22 of the metal stem 20 is deformed by the pressure applied thereto, distorts itself in accordance with the deformation of the diaphragm 22 and converts the distortion into an electrical signal.

In the first tubular member 1, the sensing element 30 and the diaphragm 22 of the metal stem 20 constitute a sensing section 22, 30 that outputs an electrical signal indicative of the in-cylinder pressure P.

As described above, in this embodiment, the first tubular member 1 having a hollow portion therein includes the sensing section 22, 30 outputting an electrical signal indicative of the pressure P located at one end thereof, and the opening section 21 formed at the other end thereof.

As shown in FIGS. 1, 2, the metal case 15 is connected and fixed to the opening section 21 of the metal stem 20. The metal case 15, which has a tubular shape and constitutes a main body of the second tubular member 2, is made of metal such as stainless steel. One end of the metal case 15 forms an opening section 16, and the other end of the metal case 15 is closed by the pressure-receiving diaphragm 14.

The pressure-receiving diaphragm 14, which is made of a circular metal, is joined and fixed to the other end of the metal case 15 by brazing or welding at its circumference. The pressure-receiving diaphragm 14 deforms when applied with the pressure P shown by the arrows in FIGS. 1, 2 from the combustion chamber which it faces.

As described above, in this embodiment, the second tubular member 2 having a hollow portion therein includes the opening section 16 formed at one end thereof, and the pressure-receiving diaphragm 14 located at the other end thereof. The opening section 16 of the second tubular member 2 is fixed to the opening section 21 of the first tubular member 1.

The fixation between the first and second tubular members 1, 2 is made by pressure-inserting the opening section 21 of the metal stem 20 into the opening section 16 of the metal case 15, and joining them together at a weld portion K1. This joining may be performed by all-around laser welding. The hollow portion of the metal case 15 and the hollow portion of the metal stem 20 communicate with each other.

A pressure transmission member 17 is located in a hollow space of the first and second tubular members 1, 2 integrally connected and fixed to each other, that is, located in the space formed by the hollow portion of the metal stem 20 and the hollow portion of the metal case 15. The pressure transmission member 17 is made of metal such as stainless steel or ceramic.

One end portion of the pressure transmission member 17 is located on the side of the sensing section 22, 30, and the other end portion of the pressure transmission member 17 is located on the side of the pressure-receiving diaphragm 14. Accordingly, the pressure P applied to the pressure-receiving diaphragm 14 is transmitted to the sensing section 22, 30 through the pressure transmission member 17.

More precisely, the one end portion of the pressure transmission member 17 is in contact with the diaphragm 22 in a state of applying load to the diaphragm 22, and the one end portion of the pressure transmission member 17 is in contact with the pressure-receiving diaphragm 14 in a state of applying load to the pressure-receiving diaphragm 14.

Although the pressure transmission member 17 has a rod like shape in this embodiment, it may have a sphere shape, or an oblate sphere shape, or a drum shape if the function of transmitting the pressure P is assured.

The first and second tubular members 1, 2 integrally connected to each other are supported by the housing 10 in a state of being inserted into the opening section 11 of the housing 10 such that the sensing section 22, 30 is located inside the housing 10 and the pressure-receiving diaphragm 14 projects from the housing 10.

More specifically, the first and second tubular members 1, 2 integrally connected to each other is fixed to the housing 10 in such a state that their portion ranging from the sensing section 22, 30 to a midway of the second tubular member 2 is inserted into the opening section 11 of the housing 10, so that a connection portion between the first and second tubular members 1, 2 is located inside the housing 10. Here, the connection portion is a portion around the weld portion K1 at which the metal stem 20 is pressure-inserted into the metal case 15.

In addition, the second tubular member 2 is fixed to the opening section 11 of the housing 10 at its outer periphery. This fixation is made by pressure-inserting the metal case 15 into the opening section 11 of the housing 10, and joining them together at a weld portion K2. This joining may be performed by all-around laser welding. The first and second tubular members 1, 2 integrally connected to each other are thus supported by the housing 10.

In this embodiment, the connection portion between the metal stem 20 and the metal case 15 is located on a more inner side of the housing 10 than the connection portion between the first and second tubular members 1, 2 and the housing 10.

As shown in FIG. 2, the diameter D1 of the hollow space of the integrated first and second tubular members 1, 2 at the midway of the pressure transmission member 17 is smaller than the diameters D2, D3 at the ends of the pressure transmission member 17.

By narrowing the hollow space of the integrated first and second tubular members 1, 2 at its midway portion, it becomes possible to suppress the pressure transmission member 17 from rattling in the direction orthogonal to the longitudinal direction of the pressure transmission member 17. Thus, the pressure transmission member 17 is securely held inside the first and second tubular members 1, 2.

A lubricant such as a silicone oil may be charged between the first and second tubular members 1, 2 and the pressure transmission member 17 in order to reduce friction between the outer periphery of the pressure transmission member 17 and the inner peripheries of the first and second tubular members 1, 2.

In this embodiment, the wall thickness of the metal case 15 is made larger than that of the metal stem 20, so that the diameter D1 can be made smaller than the diameters D2, D3. The large wall thickness of the metal case 15 also provides an advantage that the depth of the weld portion K2 can be made large to increase the weld strength.

As shown in FIG. 1, the pressure sensor 100 of this embodiment further includes a circuit board 40 located inside the housing 10. The circuit board 40, which may be a ceramic board, is bonded and fixed to the housing 10.

An IC chip 42 is bonded and mounted on the circuit board 40. The IC chip 42 includes a circuit formed therein for amplifying and adjusting the output signal of the sensing element 30.

The IC chip 42 and the circuit board 40 are electrically connected to each other by bonding wires 44 made of aluminum or gold. As show in FIGS. 1, 2, the circuit board 40 and the sensing element 30 are electrically connected to each other by a wiring member 50.

In this embodiment, an FPC (Flexible Printed Circuit board) is used as the wiring member 50. The wiring member 50 is not limited to the FPC. For example, it may be a lead wire member.

The FPC 50 is electrically and mechanically connected to the sensing element 30 by solder or the like at its one end portion 51. More specifically, although not shown in the figures, a conductor portion of the FPC 50 is connected to a pad formed on a surface of the sensing element 30.

The FPC 50 is bent such that it extends from the one end portion 51 thereof connected to the sensing element 30 in the longitudinal direction until the other end portion thereof 52 reaches the circuit board 40.

The FPC 50 passes through a through hole 46 formed in the circuit board 40 and is bent to form the other end portion 51 located on a reverse surface of the circuit board 40 on whose front surface or mounting surface the IC chip 42 is located. The other end portion 52 of the FPC 50 is electrically connected to the circuit board 40 by solder or the like at the rear surface of the circuit board 40.

As shown in FIG. 1, the pressure sensor 100 further includes a connector case 60 joined to the housing 10 and housing therein a terminal 61 extending from the circuit board 40.

The connector case 60 is made of resin such as PPS (polyphenylene sulfide). The terminal 61 is formed integrally with the connector case 60 by insert molding or the like. The connector case 60 serves as connector for taking out the signal outputted from the sensing element 30 to the outside.

The terminal 61 housed in the connector case 60 and the circuit board 40 are electrically connected to each other through a spring member 62. Accordingly, the sensing element 30 and the terminal 61 are electrically connected to each other through the FPC 50 and the circuit board 40.

As shown in FIG. 1, the other end portion of the housing 10 is crimped to the connector case 60, so that they are fixed integrally to each other. By connecting the terminal 61 to a vehicle ECU (Electronic Control Unit) through a not shown wiring member, the pressure sensor 100 can exchange signals with the outside.

The pressure sensor 100 having the above described structure is mounted to the engine head by screwing the threads 12 formed in the outer periphery of the housing 10 into a screw hole formed in the engine head.

As shown by the arrows in FIGS. 1, 2, the pressure P in the combustion chamber applied to the pressure-receiving diaphragm 14 is transmitted through the pressure transmission member 17 to be applied to the diaphragm 22 of the metal stem 20. In consequence, the diaphragm 22 of the metal stem 20 deforms, and the sensing element 30 converts this deformation into an electrical signal.

The signal outputted from the sensing element 30 is sent to the circuit board 40 through the FPC 50, processed by the IC chip 42, and then outputted to the outside by way of the terminal 61.

In the following, a method of manufacturing the pressure sensor 100 having the above described structure is described. In the beginning, the first tubular member 1 including the sensing section 22, 30, the second tubular member 2 including the pressure-receiving diaphragm 14, and the pressure transmission member 17 are prepared.

Next, the first tubular member 1 is pressure-inserted and assembled into the second tubular member 2 in a state of the pressure transmission member 17 being housed in them. At this time, a lubricant oil is charged as necessary. After that, the one end portion 51 of the FPC 51 is joined to the sensing element 30 of the first tubular member by solder or the like, and then the other end portion 52 of the FPC 50 is inserted into the opening section 11 of the housing 10.

Next, the first and second tubular members 1, 2 integrated to each other by the pressure insertion is pressure-inserted and assembled into the opening section 11 of the housing 10 at a part of the metal case 15. Subsequently, the other end portion 52 of the FPC 50 is passed through the through hole 46 of the circuit board 40 on which the IC chip 42 is wire-bond mounted, and then the other end portion 52 of the FPC 50 and the circuit board 40 are joined by solder or the like.

Next, the circuit board 40 is joined and fixed to the housing 10. Thereafter, the connector case 60 is assembled into the housing 10, and the other end portion 13 of the housing 10 is crimped to assemble the connector case 60 to the housing 10. At the time of assembling the connector case 60 to the housing 10, the terminal 61 and the circuit board 40 are brought in spring contact with each other by means of the spring member 62 so that they are electrically connected to each other.

Thereafter, the pressure-insertion portion between the first and second tubular members 1, 2, and the pressure-insertion portion between the second tubular member 2 and the housing 10 are subjected to laser welding or the like, so that they melt into each other at these portions to form the weld portions K1, K2.

Although the weld portions K1, K2 are formed by all-around welding in this embodiment, they may be formed by intermittent welding if sufficient weld strength can be assured.

Forming the weld portions K1, K2 completes the pressure sensor 100 of this embodiment.

According to this embodiment, since the fixing portion between the first and second tubular members 1, 2 is located inside the housing 10, if the first and second tubular members 1, 2 are axially misaligned, it does not affect the outer shape of the pressure sensor 100.

That is, if the first and second tubular members 1, 2 are axially misaligned, it does not affect the mountability of the pressure sensor 100 to the engine head. In this embodiment, only the fixing portion between the metal case 15 of the second tubular member 2 and the opening section 11 of the housing 10 can cause an axial misalignment substantially affecting the mountability.

As afore-described, in the conventional pressure sensor shown in FIG. 7, the number of the fixing portions that may cause the axial misalignment substantially affecting the mountability is two. On the other hand, according to this embodiment of the invention, this number is reduced to one. Accordingly, in accordance with this embodiment, it is possible to suppress the cumulative axial misalignment in the assembly structure of the first and second tubular members 1, 2 and the housing 10.

Furthermore, in accordance with this embodiment, since the outer periphery of the second tubular member 2 and the inner periphery if the opening section 11 of the housing 10 are fixed to each other by pressure insertion, and accordingly, since there is no clearance therebetween, the axial misalignment due to such clearance does not occur unlike the conventional assembly structure shown in FIG. 7. Besides, since the second tubular member 2 and the housing 10 are fixed to each other by welding in addition to the pressure insertion, the fixation strength therebetween can be further increased.

Likewise, the first and second tubular members 1, 2 are fixed to each other by the pressure insertion of the metal stem 20 into the metal case 15, and by the welding therebetween.

Accordingly, the above described advantage of preventing the axial misalignment due to the clearance, and the further increase of the fixation strength can be obtained also for the fixation between the metal stem 20 and the metal case 15.

Second Embodiment

Figure 3:
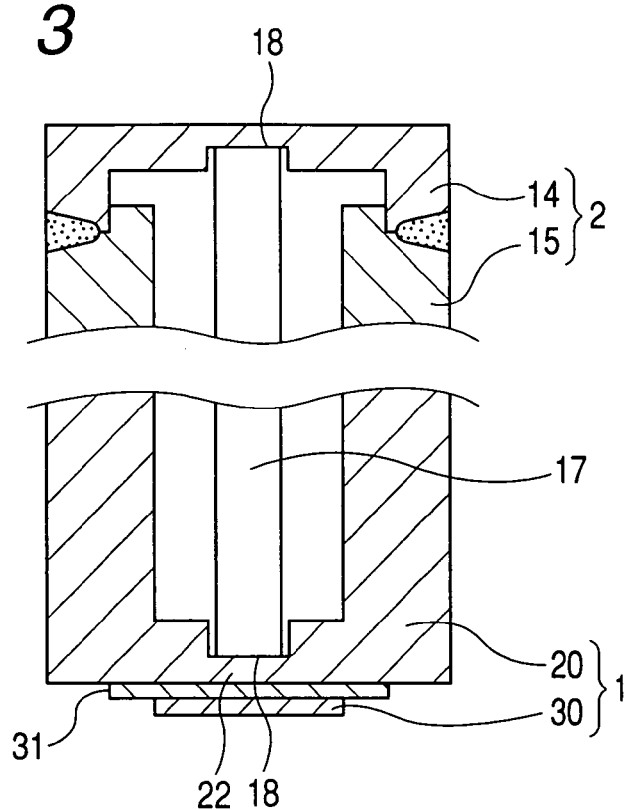
FIG. 3 is a schematic cross-sectional view showing a major part around a pressure transmission member of a pressure sensor according to a second embodiment of the invention.

FIG. 3 is a schematic cross-sectional view showing a major part around the pressure transmission member 17 of a pressure sensor according to a second embodiment of the invention. The pressure sensor of the second embodiment is the same in structure in the pressure sensor of the first embodiment shown in FIG. 1 for other parts not shown in FIG. 3.

As shown in FIG. 3, in this embodiment, a displacement preventing section 18 is provided in each of the diaphragm 22 of the metal stem 20 and the pressure-receiving diaphragm 14.

The displacement preventing section 18 serves to fix the end portions of the pressure transmission member 17, so that the pressure transmission member 17 does not displace in the direction orthogonal to the longitudinal direction thereof within the first and second tubular members 1, 2.

If the pressure transmission member 17 displaces in the direction orthogonal to the longitudinal direction thereof, there may occur a problem that the pressure transfer sensitivity of the pressure transmission member 17 is lowered. The displacement preventing section 18 can eliminate this problem.

In this embodiment, the displacement preventing section 18 is formed as an engaging section constituted by a recess formed in each of the diaphragm 22 of the metal stem 20 and the pressure-receiving diaphragm 14 at their portions respectively facing the end portions of the pressure transmission member 17. The end portions of the pressure transmission member 17 are fitted into these recesses 18.

Figure 4:
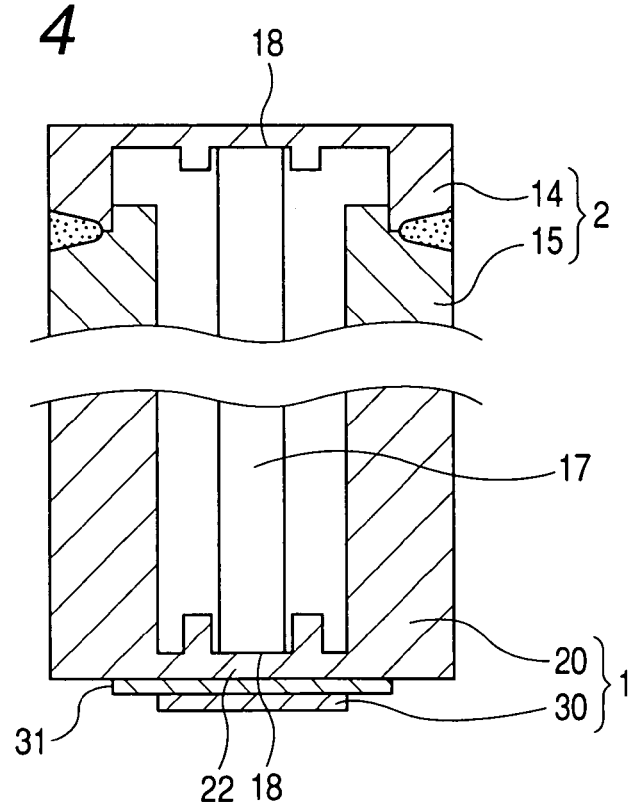
FIG. 4 is a diagram showing a variant of a displacement preventing section included in the pressure sensor according to the second embodiment of the invention.

FIG. 4 shows a variant of the displacement preventing section 18. In this variant, the displacement preventing section 18 is constituted by a recess as described above and a wall surrounding the recess. The displacement preventing sections 18 shown in FIG. 3 and FIG. 4 can be formed by cutting work or the like.

Figure 5:
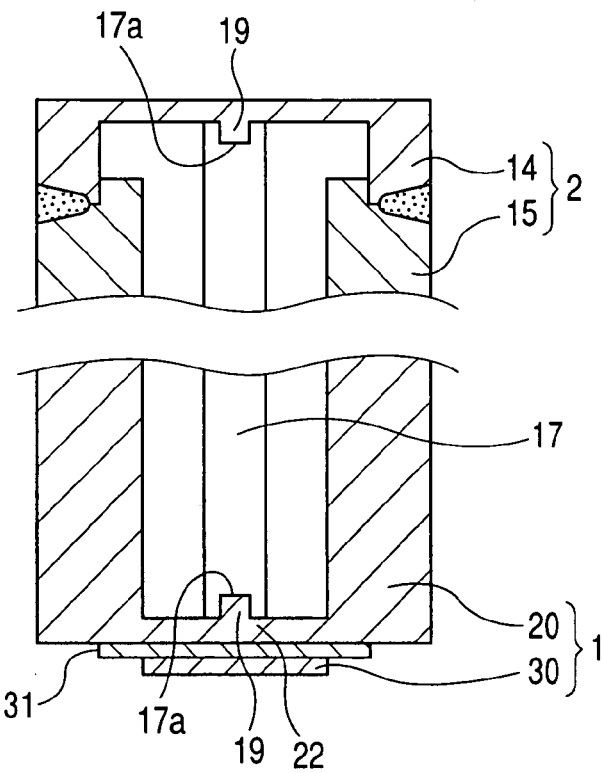
FIG. 5 is a diagram showing another variant of the displacement preventing section.

FIG. 5 shows another variant of the displacement preventing section 18. In this variant, the pressure transmission member 17 is formed with a recess 17*a* at each end portion thereof, and each of the diaphragm 22 of the metal stem 20 and the pressure-receiving diaphragm 14 is provided with a projection 19.

The projections 19 are fitted into the recesses 17*a* formed in the end portions of the pressure transmission member 17 to thereby fix each end portion of the pressure transmission member 17.

Figure 6A:
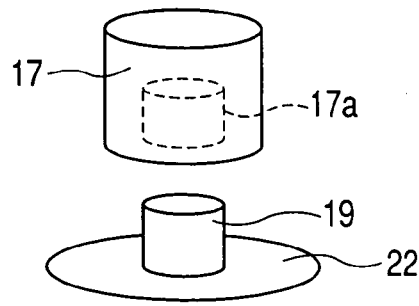
FIGS. 6A to 6D are diagrams each showing an example of the shape of a projection and a corresponding recess formed as the displacement preventing section.
Figure 6B:
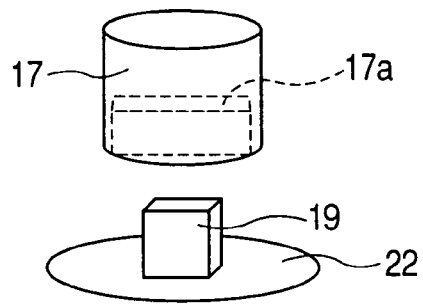
Figure 6C:
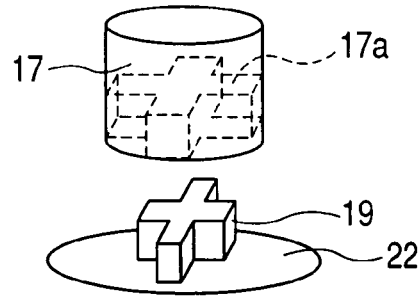
Figure 6D:
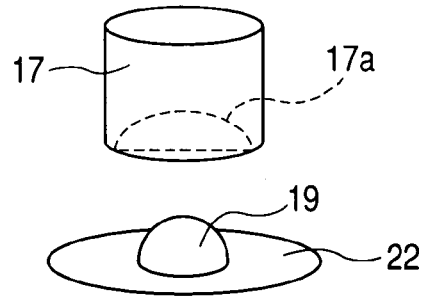

The recess 17*a* and the projection 19 may have various shapes. Each of FIGS. 6A to 6D shows an example of the shape of the projection 19 formed in the diaphragm 22 of the metal stem 20 and the corresponding recess 17*a*. As shown in these figures, they may have a cylindrical shape (FIG. 6A), or a square column shape (FIG. 6B), or a cross-column shape (FIG. 6C), or a hemispherical shape (FIG. 6D). The recess 17*a* and the projection 19 may not be geometrically similar in shape, if its function of preventing the pressure transmission member 17 from displacing can be assured.

The displacement preventing section at the diaphragm 22 of the metal stem 20, and that at the pressure-receiving diaphragm 14 may be the same with each other or different from each other in structure.

For example, it is possible that the displacement preventing section at the diaphragm 22 of the metal stem 20 is as shown in FIG. 3 (recess 18), and that at the pressure-receiving diaphragm 14 is as shown in FIG. 5 (projection 19). Any of the structures described with reference to FIG. 3 to FIGS. 6A to 6B can be used as the displacement preventing section at the side of the diaphragm 22 of the metal stem 20 and at the side of the pressure-receiving diaphragm 14.

Incidentally, it may occur that preventing the pressure transmission member 17 from displacing in the direction orthogonal to the longitudinal direction of the pressure transmission member 17 is possible by disposing an O-ring between the pressure transmission member 17 and the inner peripheries of the first and second tubular members 1, 2. However, mounting the O-ring to the pressure transmission member 17 having a small diameter is disadvantageous in terms of mass production efficiency. This embodiment is advantageous in this respect, because it does not need such an O-ring.

Other Embodiments

In the above described embodiments, the fixation between the first and second tubular members 1, 2, that is, the fixation between the metal stem 20 and the metal case 15 is made by pressure-inserting the opening section 21 of the metal stem 20 into the opening section 16 of the metal case 15. However, the fixation may be made by pressure-inserting the opening section 16 of the metal case 15 into the opening section 21 of the metal stem 20 when it is possible to change the areas of these openings while keeping communication between the hollow portions of the first and second tubular members 1, 2.

Although the fixation between the first and second tubular members 1, 2, and the fixation between the second tubular member 2 and the housing 10 are made by both the pressure insertion and the welding in the above described embodiments, they may be made by only the pressure insertion.

Conversely, they may be made by only the welding. Also in this case, since the number of the fixing portions which may cause the axial misalignment substantially affecting the mountability of the pressure sensor can be reduced from two to one compared to the conventional pressure sensor, it is possible to suppress the cumulative axial misalignment in the assembly structure of the first and second tubular members 1,2 and the housing 10.

The construction of the displacement preventing section is not limited to those described in the second embodiment. For example, the pressure transmission member 17 can be fixed by adhesive, or brazing ally, or solder.

In the second embodiment, the displacement preventing section is provided in both the sensing section 22, 30 and the pressure-receiving diaphragm 14. However, it may be provided in only one of them.

The shape of the housing 10 is not limited to the one shown in FIG. 1. The housing 10 ma have any shape appropriate to detect the combustion pressure. The pressure sensors of the above described embodiments may be used for detecting pressure other than the pressure of combustion pressure of an engine.

The sensing element 30 may be of a type other than the type having the distortion gauge function, if it can output an electrical signal indicative of the pressure transmitted through the pressure transmission member 17. The pressure-receiving diaphragm 14 may be formed integrally with the metal case 15.

The above explained preferred embodiments are exemplary of the invention of the present application which is described solely by the claims appended below. It should be understood that modifications of the preferred embodiments may be made as would occur to one of skill in the art.

What is claimed is:

1. A pressure sensor comprising:
 a first tubular member including at one end portion thereof a sensing section outputting an electrical signal indicative of a pressure applied thereto, and an opening section formed at the other end portion thereof;
 a second tubular member including an opening section formed at one end portion thereof, and a diaphragm located at one end portion thereof;
 a housing having an opening at one end portion thereof; and
 a pressure transmission member operating to transmit a pressure applied thereto to said sensing section;
 said first and second tubular members being integrally connected to each other at said opening section of said first tubular member and said opening section of said second tubular member,
 said pressure transmission member being housed in a hollow space of said first and second tubular members integrally connected to each other such that one end portion thereof is located at a side of said sensing section and the other end portion thereof is located at a side of said diaphragm,
 said first and second tubular members integrally connected to each other being inserted into said opening section of said housing to be supported by said housing such that said sensing section is located inside said housing and said diaphragm projects from said housing,
 wherein said first and second tubular members integrally connected to each other is inserted into said opening section of said housing so that a fixing portion between said first and from a side of said sensing section, so that a fixing portion between said second tubular members is located inside said housing, an outer periphery of said second tubular member being pressure-insertion fixed to an inner periphery of said opening section of said housing,
 wherein a diameter of said hollow space at a position at which a midway portion of said pressure transmission member is located is smaller than diameters of said hollow space at positions at which end portions of said pressure transmission member are located respectively, and
 wherein a midway portion of said hollow space facing said midway portion of said pressure transmission member is formed by said second tubular member, and a wall thickness of said second tubular member is larger than a wall thickness of said first tubular member.

2. The pressure sensor according to claim 1, wherein said outer periphery of said second tubular member and said inner periphery of said opening section of said housing are joined together by welding.

3. The pressure sensor according to claim 1, wherein said first and said second tubular members are fixed to each other at said fixing portion by pressure-inserting one of said opening section of said first tubular member and said opening section of said second tubular member into the other of said opening section of said first tubular member and said opening section of said second tubular member.

4. The pressure sensor according to claim 1, wherein a displacement preventing section operating to prevent one of end portions of said pressure transmission member from displacing in a direction orthogonal to a longitudinal direction thereof is provided in at least one of said sensing section and said diaphragm.

5. The pressure sensor according to claim 4, wherein said displacement preventing section is provided in only one of said sensing section and said diaphragm.

6. The pressure sensor according to claim 4, wherein said displacement preventing section is provided in both of said sensing section and said diaphragm.

7. The pressure sensor according to claim 4, wherein said displacement preventing section is formed as an engagement section facing one of said end portions of said pressure transmission member, said one of said end portions of said pressure transmission member being engaged with said engagement section.

8. The pressure sensor according to claim 7, wherein said engagement section is constituted by a recess into which said one of said end portions of said pressure transmission member is fitted.

9. The pressure sensor according to claim 7,
 wherein the pressure transmission member comprises the projection at the one of said end portions thereof,
 wherein the engagement section facing the pressure transmission member comprises the recess, and
 wherein the projection fits into the recess.

* * * * *